(12) United States Patent
Liu et al.

(10) Patent No.: US 11,488,624 B1
(45) Date of Patent: Nov. 1, 2022

(54) BALL BEARING CARTRIDGE FOR LINEAR ACTUATOR

(71) Applicant: Seagate Technology LLC, Fremont, CA (US)

(72) Inventors: Xiong Liu, Singapore (SG); YiChao Ma, Singapore (SG); Than Zaw Myint, Singapore (SG); YongJie Tang, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/479,679

(22) Filed: Sep. 20, 2021

(51) Int. Cl.
*G11B 5/48* (2006.01)
*G11B 5/55* (2006.01)

(52) U.S. Cl.
CPC .......... *G11B 5/4833* (2013.01); *G11B 5/4813* (2013.01); *G11B 5/4886* (2013.01); *G11B 5/5521* (2013.01); *G11B 5/5573* (2013.01)

(58) Field of Classification Search
None
See application file for complete search history.

(56) References Cited

U.S. PATENT DOCUMENTS

| | | | |
|---|---|---|---|
| 4,034,613 A | 7/1977 | Halfhill et al. | |
| 4,189,759 A | 2/1980 | Bauck et al. | |
| 4,287,445 A | 9/1981 | Lienau | |
| 4,322,840 A | 3/1982 | Kusaka | |
| 4,376,294 A | 3/1983 | Meier et al. | |
| 4,392,165 A | 7/1983 | Wright | |
| 4,393,425 A | 7/1983 | Wright | |
| 4,462,054 A | 7/1984 | Dong et al. | |
| 4,545,046 A | 10/1985 | Jansen et al. | |
| 4,613,962 A | 9/1986 | Inoue et al. | |
| 4,631,611 A | 12/1986 | Schneider | |
| 4,663,682 A | 5/1987 | McNeil | |
| 4,672,490 A | 6/1987 | Shigenai et al. | |
| 4,703,375 A | 10/1987 | Chan et al. | |

(Continued)

FOREIGN PATENT DOCUMENTS

FR 2749696 A1 12/1997

OTHER PUBLICATIONS

Non-Final Rejection for U.S. Appl. No. 17/233,818, dated Oct. 22, 2021, 8 pages.

(Continued)

*Primary Examiner* — Craig A. Renner
(74) *Attorney, Agent, or Firm* — Westman, Champlin & Koehler, P.A.

(57) ABSTRACT

An exemplary data storage device includes an actuator arm assembly, a top guide rail, a bottom guide rail, and a first ball bearing. The actuator arm assembly includes a first post defining a pivot axis that is inclined between about 5 degrees and about 25 degrees from a horizontal plane defined by a data storage disk surface. The top guide rail includes a first rolling surface that is parallel to the pivot axis. The bottom guide rail is spaced from the top guide rail and includes a second rolling surface that is parallel to the first rolling surface. The first ball bearing includes a first inner race and a first outer race, the first inner race surrounding the first post, and the first outer race in contact with the first rolling surface or the second rolling surface. An exemplary method of assembling a data storage device is also described.

20 Claims, 9 Drawing Sheets

(56) References Cited

U.S. PATENT DOCUMENTS

| | | | |
|---|---|---|---|
| 4,730,226 A * | 3/1988 | Shatkin | G11B 5/5521 360/266.6 |
| 4,740,946 A | 4/1988 | Yumura et al. | |
| 4,742,410 A | 5/1988 | Smith | |
| 4,745,503 A | 5/1988 | Muraoka et al. | |
| 4,763,314 A | 8/1988 | McCaslin et al. | |
| 4,764,829 A | 8/1988 | Makino | |
| 4,792,707 A | 12/1988 | Katanuma | |
| 4,800,818 A | 1/1989 | Kawaguchi et al. | |
| 4,819,108 A | 4/1989 | Seki et al. | |
| 4,853,808 A | 8/1989 | Lutz | |
| 4,888,751 A | 12/1989 | Yoshimaru et al. | |
| 4,902,971 A | 2/1990 | Guzik et al. | |
| 4,937,692 A | 6/1990 | Okutsu | |
| 4,974,104 A | 11/1990 | Ferguson et al. | |
| 5,007,712 A | 4/1991 | Kikuchi et al. | |
| 5,016,238 A | 5/1991 | Shtipelman et al. | |
| 5,029,030 A | 7/1991 | Luecke | |
| 5,043,964 A | 8/1991 | Suzuki | |
| 5,070,423 A * | 12/1991 | Gloski | G11B 5/5521 360/266.5 |
| 5,229,901 A | 7/1993 | Mallary | |
| 5,317,552 A | 5/1994 | Yamasaki | |
| 5,396,385 A | 3/1995 | Tangi et al. | |
| 5,467,238 A | 11/1995 | Lee et al. | |
| 5,493,463 A | 2/1996 | Hagen | |
| 5,521,778 A | 5/1996 | Boutaghou et al. | |
| 5,801,531 A | 9/1998 | Viches et al. | |
| 5,825,180 A | 10/1998 | Guzik | |
| 5,875,166 A | 2/1999 | Ikegame et al. | |
| 5,968,627 A | 10/1999 | Nigam et al. | |
| 6,043,957 A | 3/2000 | Hattori et al. | |
| 6,064,550 A | 5/2000 | Koganezawa | |
| 6,157,521 A | 12/2000 | Utsunomiya | |
| 6,310,750 B1 | 10/2001 | Hawwa et al. | |
| 6,344,950 B1 | 2/2002 | Watson et al. | |
| 6,356,640 B1 | 3/2002 | Lin | |
| 6,362,933 B1 | 3/2002 | Sampietro et al. | |
| 6,369,988 B1 | 4/2002 | Yoshida et al. | |
| 6,480,361 B1 | 11/2002 | Patterson | |
| 6,549,377 B2 | 4/2003 | Yoshida et al. | |
| 6,765,744 B2 | 7/2004 | Gomez et al. | |
| 6,987,637 B2 | 1/2006 | Litvinov et al. | |
| 7,027,147 B2 | 4/2006 | Steenhoek et al. | |
| 7,072,147 B2 | 7/2006 | Limmer et al. | |
| 7,199,981 B2 | 4/2007 | Zabtcioglu | |
| 7,372,671 B2 | 5/2008 | Yazawa | |
| 7,375,930 B2 | 5/2008 | Yang et al. | |
| 7,492,542 B2 | 2/2009 | van Zyl | |
| 7,652,847 B2 | 1/2010 | Weiss et al. | |
| 7,672,083 B1 | 3/2010 | Yu et al. | |
| 7,710,683 B2 | 5/2010 | Craig et al. | |
| 8,958,172 B1 | 2/2015 | Hansen | |
| 8,958,173 B1 | 2/2015 | Hirano et al. | |
| 9,218,833 B1 | 12/2015 | Shah et al. | |
| 9,361,919 B1 | 6/2016 | Lieu et al. | |
| 9,424,866 B1 | 8/2016 | Cao et al. | |
| 10,192,575 B1 | 1/2019 | Resh | |
| 10,249,339 B1 | 4/2019 | Mendonsa et al. | |
| 10,269,380 B1 | 4/2019 | Sun et al. | |
| 10,431,246 B2 | 10/2019 | Zhu et al. | |
| 10,510,373 B1 | 12/2019 | Granz et al. | |
| 10,622,012 B1 | 4/2020 | Tu et al. | |
| 10,699,730 B1 | 6/2020 | Uefune et al. | |
| 10,706,879 B2 | 7/2020 | Garbarino | |
| 10,803,891 B1 | 10/2020 | Jacoby et al. | |
| 10,818,317 B1 | 10/2020 | Erden et al. | |
| 10,978,100 B1 | 4/2021 | Myers | |
| 11,037,590 B2 | 6/2021 | Nguyen et al. | |
| 11,062,734 B1 | 7/2021 | Brand | |
| 11,120,834 B1 | 9/2021 | Herdendorf et al. | |
| 2004/0008609 A1 | 1/2004 | Fujibayashi et al. | |
| 2004/0087253 A1 | 5/2004 | Mahadev et al. | |
| 2004/0130320 A1 | 7/2004 | Guzik et al. | |
| 2004/0179465 A1 | 9/2004 | Kuwajima et al. | |
| 2004/0257710 A1 | 12/2004 | Limmer et al. | |
| 2005/0225875 A1 | 10/2005 | Wada et al. | |
| 2005/0280945 A1 | 12/2005 | Duvall et al. | |
| 2006/0171068 A1 | 8/2006 | Taguchi | |
| 2007/0279804 A1 | 12/2007 | White | |
| 2008/0084636 A1 | 4/2008 | Oh et al. | |
| 2009/0073608 A1 | 3/2009 | Ookawa et al. | |
| 2010/0246068 A1 | 9/2010 | Lee | |
| 2011/0038074 A1 | 2/2011 | Viskochil et al. | |
| 2012/0206830 A1 | 8/2012 | Gao et al. | |
| 2016/0171993 A1 | 6/2016 | Okubo | |
| 2018/0301162 A1 | 10/2018 | Erden | |
| 2020/0027480 A1 | 1/2020 | Myers et al. | |
| 2020/0202891 A1 | 6/2020 | Mendonsa et al. | |
| 2020/0227077 A1 | 7/2020 | Sukla et al. | |
| 2021/0312945 A1 | 10/2021 | Mendonsa et al. | |

OTHER PUBLICATIONS

Cordle, Michael, "Effects of Skew Angle and Transition Curvature in Hamr Hard Disk Drives", A Thesis Submitted To the Faculty of the University of Minnesota, in Partial Fulfillment of the Requirements for the Degree of Master of Science, May 2017, 63 pages.

He, Zhimin et al., "Mechanisms of Minimum Skew Angle Actuation for Hard Disk Drives", MATEC Web of Conferences 42, 02002 (2016), DOI: 10.1051/matecconf/20164202002, © Owned by the authors, published by EDP Sciences, 2016, A*Star, Data Storage Institute, 2 Fusionopolis Way, #08-01, Innovis, Singapore 138634, 5 pages.

U.S. Appl. No. 17/223,447, filed Apr. 6, 2021, "Data Storage Device Linear Actuator", 36 pages.

U.S. Appl. No. 17/233,818, filed Apr. 19, 2021, Zero Skew Elevator System 51 pages.

U.S. Appl. No. 17/196,192, filed Mar. 9, 2021, "Rotating Ramp With Retraction Capability for a Disk Drive", 33 pages.

U.S. Appl. No. 17/016,326, filed Sep. 9, 2020, "Brake Crawler for Elevator-Type Hard Disk Drives", 30 pages.

U.S. Appl. No. 16/863,287, filed Apr. 30, 2020, "Split Ramp for Data Storage Devices", issuing as U.S. Pat. No. 11,094,347 on Aug. 17, 2021, 22 pages.

U.S. Appl. No. 17/163,983, filed Feb. 1, 2021, "Ramp Activation Systems For an Elevator Drive", 34 pages.

U.S. Appl. No. 17/172,684, filed Feb. 10, 2021, "Adjusting HGA Z-Height Via HSA Elevator Using Head/Actuator Feedback", 24 pages.

U.S. Appl. No. 17/389,950, filed Jul. 30, 2021, "Zero Skew Disk Drive With Dual Actuators", 56 pages.

U.S. Patent Office issued prosecution for U.S. Appl. No. 17/233,818, filed Apr. 19, 2021, including: Applicant Initiated Interview Summary issued Nov. 15, 2021, 2 pages; Requirement for Restriction-Election issued Sep. 20, 2021, 6 pages; 8 pages total.

Office Action from U.S. Appl. No. 17/389,950, dated Nov. 16, 2021, 8 pages.

Notice of Allowance from U.S. Appl. No. 17/389,950, dated Feb. 16, 2022, 10 pages.

Supplemental Notice of Allowance from U.S. Appl. No. 17/233,818, dated Feb. 24, 2022, 3 pages.

Notice of Allowance from U.S. Appl. No. 17/233,818, dated Feb. 2, 2022, 7 pages.

Notice of Allowance from U.S. Appl. No. 17/528,296, dated Jul. 14, 2022, 9 pages.

* cited by examiner

BALL BEARING CARTRIDGE FOR LINEAR ACTUATOR

SUMMARY

In one embodiment, a data storage device comprises an actuator arm assembly, a top guide rail, a bottom guide rail, and a first ball bearing. The actuator arm assembly comprises a first post defining a pivot axis that is inclined between about 5 degrees and about 25 degrees from a horizontal plane defined by a data storage disk surface. The top guide rail comprises a first rolling surface that is parallel to the pivot axis. The bottom guide rail is spaced from the top guide rail and comprises a second rolling surface that is parallel to the first rolling surface. The first ball bearing comprises a first inner race and a first outer race, the first inner race surrounding the first post, and the first outer race in contact with the first rolling surface or the second rolling surface.

In another embodiment, a data storage device comprises an actuator arm assembly, a top guide rail, a bottom guide rail, and a ball bearing. The actuator arm assembly comprises a first post. The top guide rail comprises a first rolling surface. The bottom guide rail is spaced from the top guide rail and comprises a second rolling surface that is parallel to the first rolling surface. The ball bearing comprises an inner race and an outer race. The ball bearing is configured to roll with the outer race in contact with the first rolling surface or the second rolling surface, and not in contact with the other of the first rolling surface or the second rolling surface. The ball bearing is configured to rotate with the inner race surrounding the first post.

In yet another embodiment, a method of assembling a data storage device comprises attaching a first ball bearing to a first post configured to extend between an actuator arm assembly and a linear motor assembly, wherein the first ball bearing comprises a first inner race, a first outer race, and a first pivot axis, and wherein the first post is part of a bearing cartridge. The method comprises positioning the bearing cartridge between a top guide rail and a bottom guide rail, at least one of the top or bottom guide rails having a rolling surface inclined between about 5 degrees and about 25 degrees from a horizontal axis. The method comprises pressing the top guide rail and the bottom guide rail toward each other to obtain an offset of the first outer race relative to the first inner race along the pivot axis, and securing a spacing between the top and bottom guide rails to maintain the offset.

Other features and benefits that characterize embodiments of the disclosure will be apparent upon reading the following detailed description and review of the associated drawings.

DETAILED DESCRIPTION OF ILLUSTRATIVE EMBODIMENTS

Figure 1A:
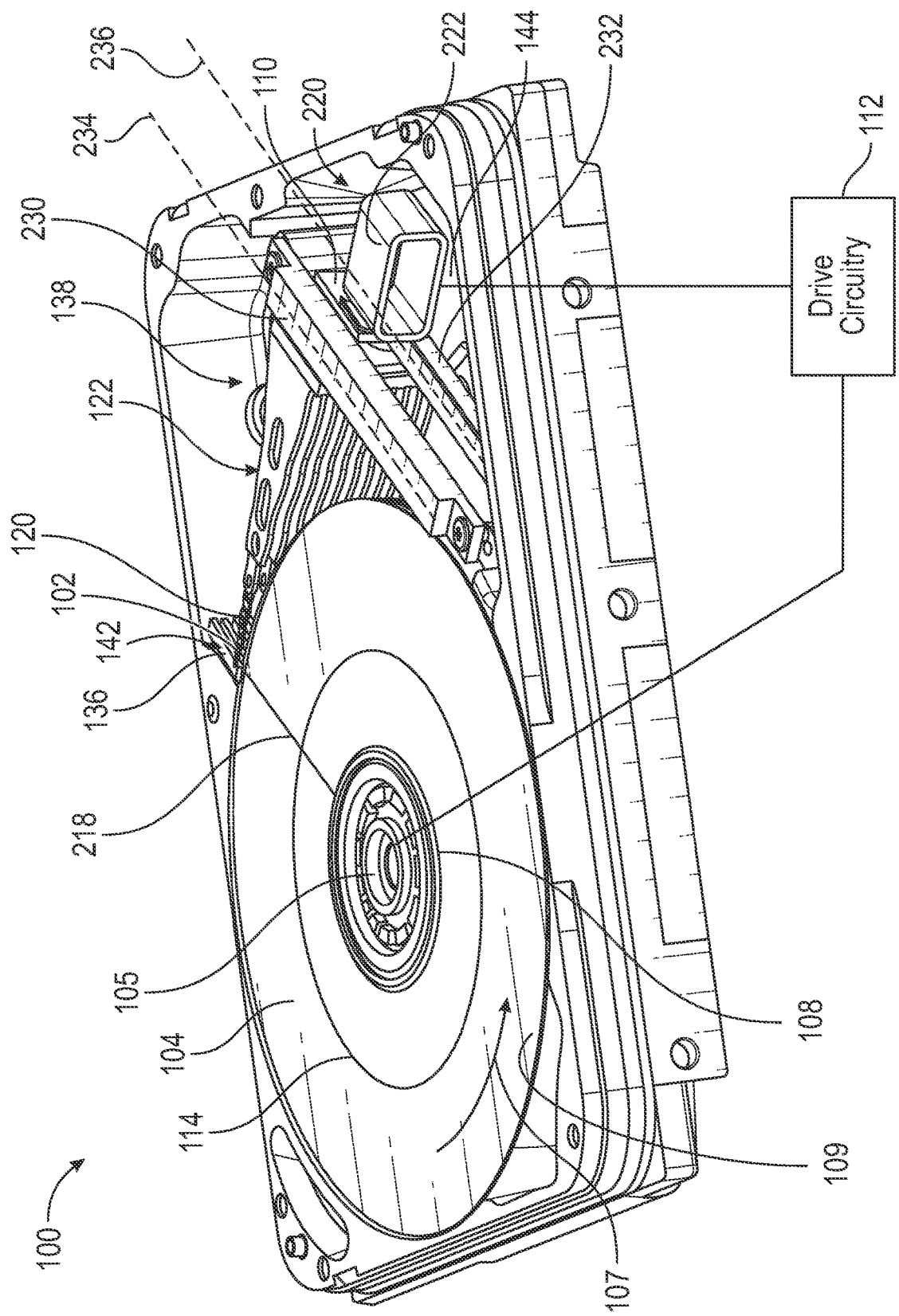
FIG. 1A is a perspective view of an exemplary embodiment of a data storage device in a first configuration, with an actuator arm assembly off media storage disks.

The present disclosure generally relates to data storage devices that utilize magnetic storage media, such as hard disks. The storage capacity of hard disk drives (HDDs) has steadily increased due to an increase in areal density provided by such technological advances as perpendicular recording, shingled magnetic recording (SMR), heat-assisted magnetic recording (HAMR), interleaved magnetic recording (IMR), microwave-assisted magnetic recording (MAMR), and helium filling, for example.

The drawing figures show illustrative operating environments in which certain embodiments disclosed herein may be incorporated. The operating environment shown in the drawings are for illustration purposes only; the described systems and methods can be practiced within any number of different types of operating environments.

It should be noted that the same reference numerals are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Figure 1B:
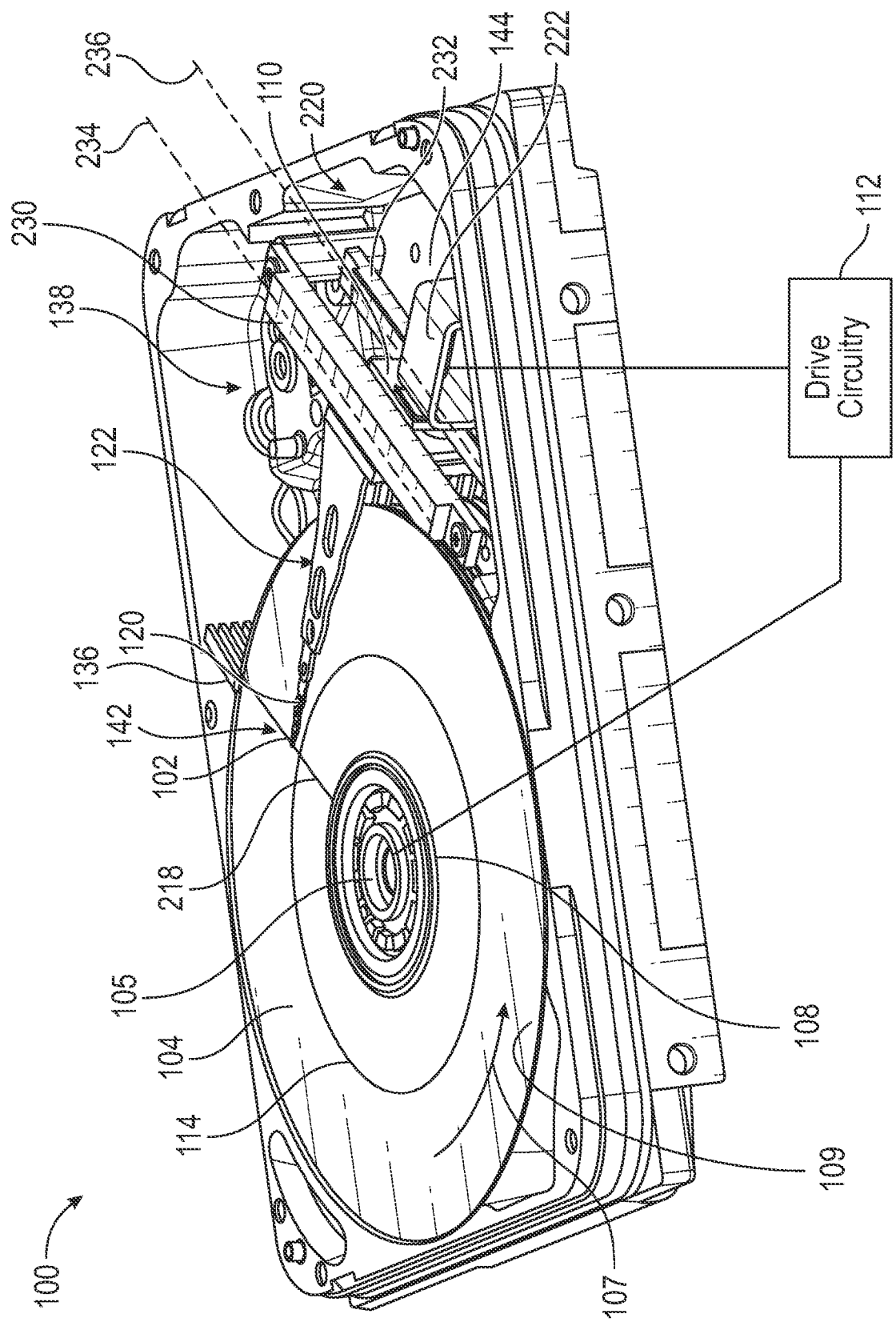
FIG. 1B is a perspective view of the exemplary data storage device in a second configuration, wherein data reading and writing heads are positioned for operation with the media storage disks.

FIGS. 1A and 1B are schematic illustrations of a data storage device (DSD) 100 in two configurations. In an exemplary embodiment, DSD 100 includes data storage media or disks 104, heads 102 for reading data from and/or writing data to the data storage media 104, and a head support ramp 136 for supporting the heads 102 off the disks 104. In an exemplary embodiment, the data storage media 104 are rotatable data storage disks, stacked on spindle 105, with each disk 104 having opposing surfaces that serve as data storage surfaces. For read and write operations, spindle 105 rotates the media 104 as illustrated by arrow 107. A linear actuator assembly 220 positions the heads 102 relative to data tracks 114 on the rotating media 104 between an inner diameter (ID) 108 and an outer diameter (OD) 109. The spindle 105 and linear actuator assembly 220 are connected to and operated through drive circuitry 112 (schematically shown).

In an exemplary embodiment, each of heads 102 is coupled to the linear actuator assembly 220 through a suspension assembly that includes a load beam 120 connected to an actuator arm assembly 122. The linear actuator assembly 220 is coupled to a frame or base deck 144 and moves the head 102 in a cross-track direction as illustrated by radius 218. Each of the heads 102 includes one or more transducer elements (not shown) coupled to head circuitry, such as through a flex circuit. The linear actuator assembly 220, the load beams 120 and the actuator arms 122 are collectively referred to as the head stack assembly (HSA) 138.

In general, in order to keep read/write heads 102 from landing on disks 104 in a data storage device when, for example, power is removed from the data storage device, and to prevent the heads 102 from colliding with outer edges of the disks 104 during load and unload operations, a head support ramp assembly 136 is provided adjacent to the OD 109 of the disks 104. Head support ramp assembly 136 supports head end 142 of HSA 138 when the actuator arm assembly 122 is moved away from the data storage disk(s) 104. In some embodiments, a lift tab (not shown) extends from the load beam 120 to rest on the head support ramp assembly 136 when the disk drive storage device is in an off or non-operating state. For use of heads 102 for reading and writing data relative to disk 104, actuator 220 is activated to slide the actuator arm assembly 122, to thereby move the head end 142 of the actuator arm assembly 122 off of the head support ramp assembly 136 and to the disks 104, as shown in FIG. 1B.

In an exemplary embodiment, linear actuator assembly 220 allows for zero skew (or fixed skew) throughout the entire stroke of the head stack assembly 138. The radial cross-track direction of travel 218 places the head 102 in alignment with any track 114 of disk 104. This allows for increased density of a data storage compared to a device with a rotating arm. For example, by configuring the slider to have zero skew throughout the entire stroke of the head 102 at head end 142 of HSA 138, the head 102 may be able to read data immediately after writing the data. In contrast, in a conventional skewed configuration, the angle of the head 102 relative to the data track 114 (such as that resulting from a stroke extending along an arc about an actuator arm pivot axis) may not allow for this immediate reading after writing. While particular descriptions of a zero skew actuator are provided, it is to be understood that other configurations can also be used, such as those described in the following commonly owned patent application, which is hereby incorporated by reference: U.S. application Ser. No. 17/233,818 filed on Apr. 19, 2021, entitled "Zero Skew Elevator System."

In a zero skew configuration as shown, the read and/or write pole at head 102, on head end 142, moves linearly along radius 218 and is therefore positioned with no skew or angular offset to a centerline of a track 114. Additional information relevant to high performance of a disk drive is provided in the following commonly owned patent applications and patents, which are hereby incorporated by reference: US Published Patent Application No. 2004/0257710 for "Hard drive actuator arm with reduced skew variation" and U.S. Pat. No. 6,987,637 for "Magnetic recording system which eliminates skew angle effect."

In an exemplary embodiment, the linear actuator assembly 220 of the data storage device 100 has top rail 230 and bottom rail 232 extending along parallel rail axes 234, 236, respectively. In an exemplary embodiment, each rail axis 234, 236 is parallel to radius 218 of disk 104 on which the head 102 travels. The rails 230, 232 may include or be formed of any suitable material, such as stainless steel or titanium, for example.

In an exemplary embodiment, the actuator arm assembly 122 is movably attached to the rails 230, 232 such that motion in the x-y plane is restricted to sliding motion along the rails 230, 232. In other words, the actuator arm assembly 122 may be movably attached to the rails 230, 232 so that the actuator arm assembly 122 moves linearly and, therefore, the at least one head 102 also moves linearly relative to the recording medium 104. While only a single head 102 is shown in the illustrations, it is to be understood that in DSD 100, one or more heads would be carried by each of the arms of actuator arm assembly 122, for interaction with each disk surface of the stack of disks 104.

In an exemplary embodiment, the linear actuator assembly 220 of the data storage device includes a linear motor 222. The linear motor 222 may include any suitable type of motor that moves the actuator arm assembly 122 linearly along the rails 230, 232. For example, the linear motor 222 may include a linear stepper motor, an inchworm motor, a linear voice coil motor, ball screw and/or gear motor, for example. In a case in which the linear motor 222 includes a linear stepper motor, a permanent alternating magnet is fixed to a drive base extending parallel to the rails 230, 232. For example, the permanent alternating magnet may alternate polarities along a length of the permanent alternating magnet.

Figure 2:
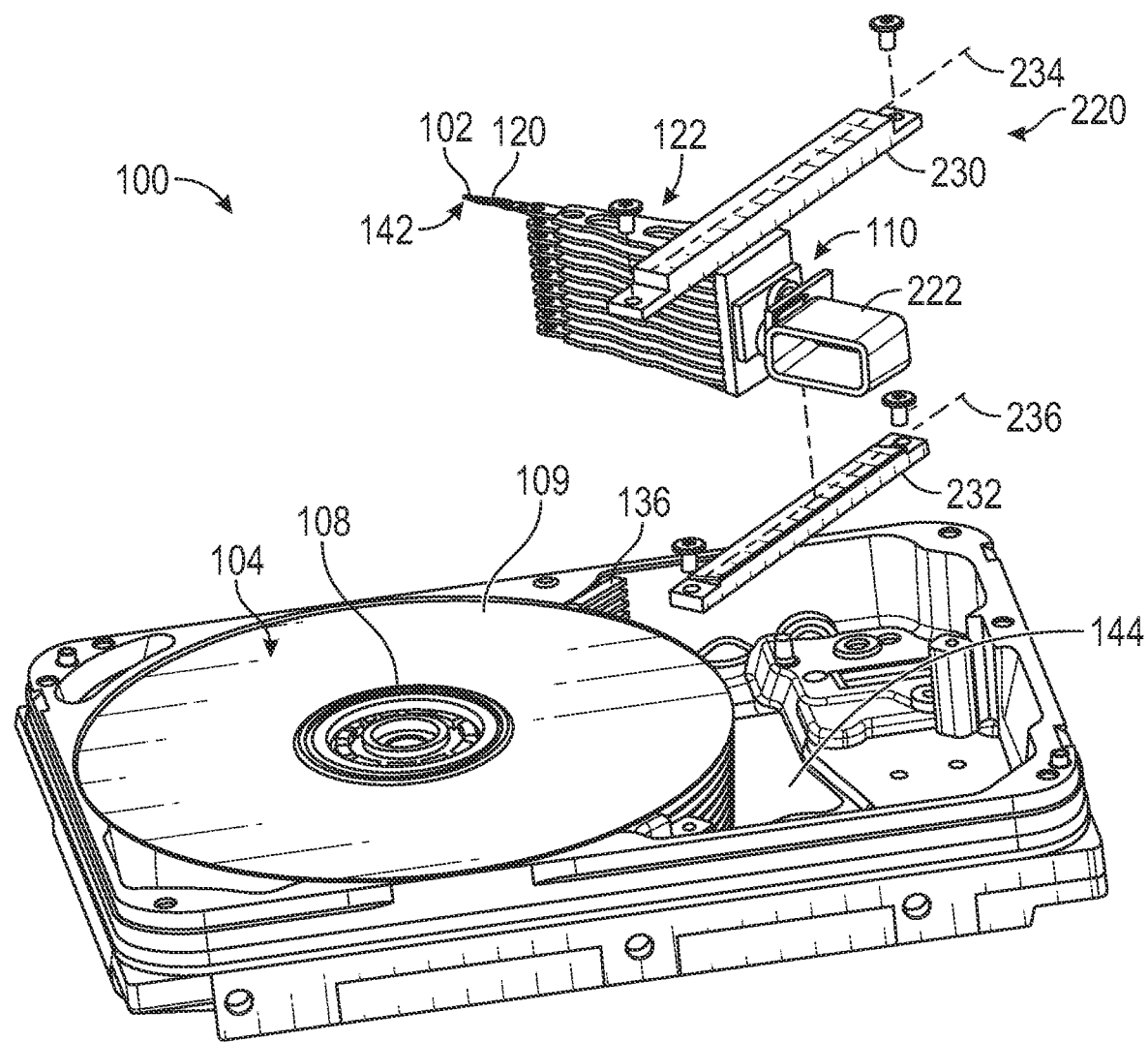
FIG. 2 is an exploded view of the exemplary data storage device.

Whatever mechanism is used in linear motor 222, its motion moves bearing cartridge 110 along and between rails 230, 232. As shown in FIG. 2, bearing cartridge 110 in turn carries actuator arm assembly 122. Accordingly, activation of linear motor 222 causes actuator arm assembly 122 and its head 102 to move linearly with the bearing cartridge 110 along rails 230, 232. As such, as shown in a comparison between FIGS. 1A and 1B, the at least one head 102 positioned on the head end 142 of the actuator arm assembly 122 moves in a straight line radially on the recording medium 104. Thus, for the entire stroke of motion along radius 218, no skew is introduced between the head 102 and a disk track, of which one track 114 is an example.

Figure 3:
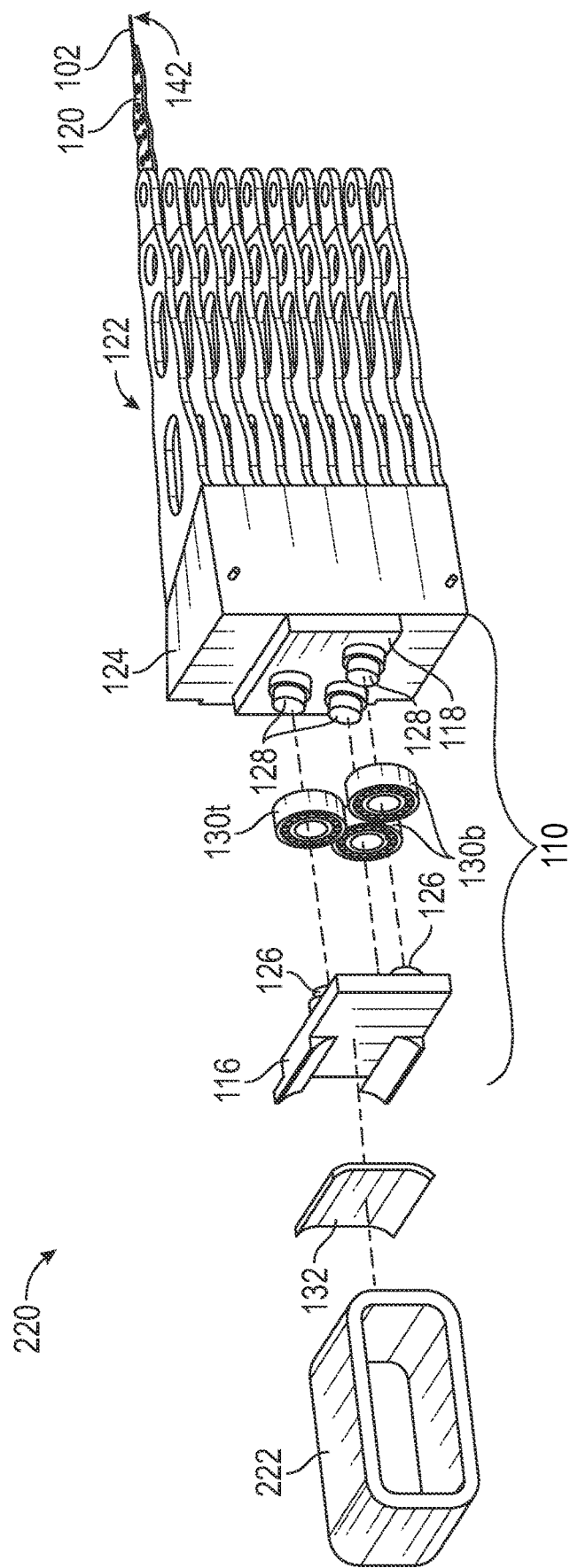
FIG. 3 is an exploded view of some components of an exemplary linear actuator assembly.
Figure 4:
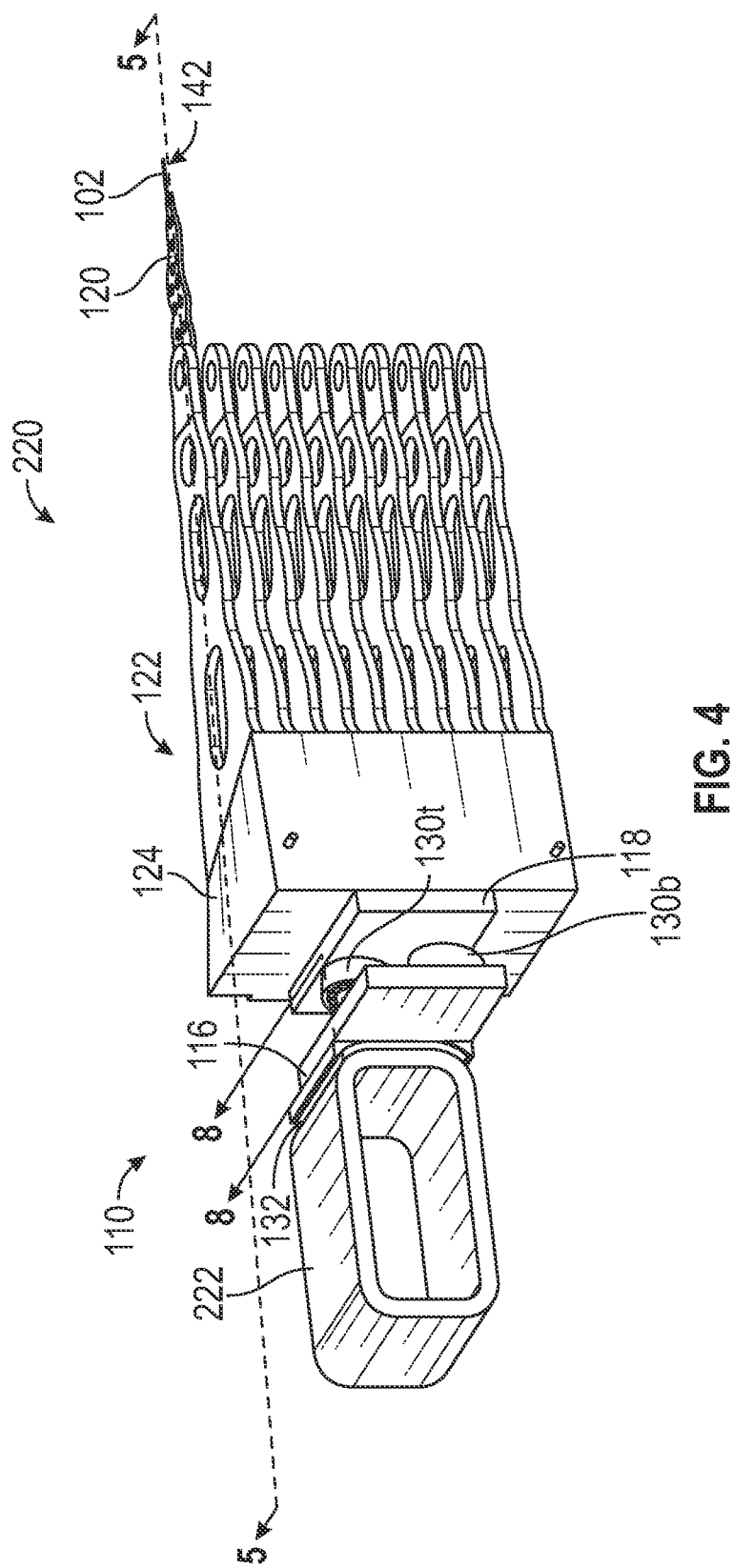
FIG. 4 is a perspective view showing the exemplary linear actuator assembly assembled from the components of FIG. 3.
Figure 5:
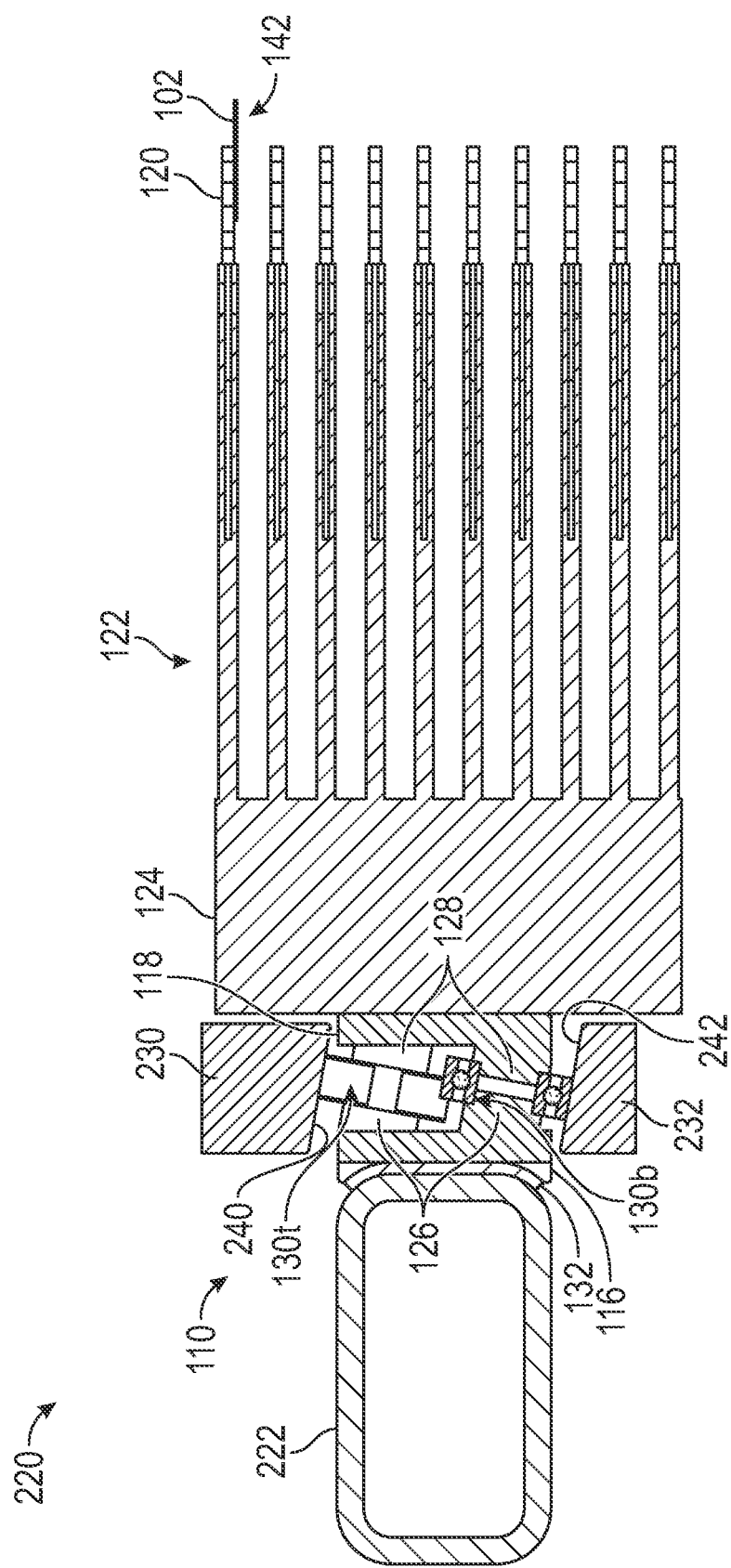
FIG. 5 is a cross sectional view of the linear actuator assembly of FIG. 4, taken along line 5-5, and additionally showing a ball bearing cartridge between top and bottom rails.

In an exemplary embodiment, as shown in FIGS. 3-5, bearing cartridge 110 is mounted between E-block 124 of actuator arm assembly 122 and a coil bobbin of the linear motor 222. A left casing 116 and right casing 118 cooperate with shafts or posts 126, 128, respectively, extending therebetween to support three ball bearings 130. The left casing 116 is attached to the linear motor 222, which in the illustrated embodiment includes a voice coil bobbin. In an exemplary embodiment, this attachment is accomplished by use of adhesive layer 132. For stability, two ball bearings 130b roll on a bottom linear rail 232 and one ball bearing 130t rolls against the top linear rail 230. In another embodiment, one ball bearing 130b rolls on a bottom linear rail 232 and two ball bearings 130t roll against the top linear rail 230. In many respects, the top ball bearing 130t and the bottom ball bearings 130b are similar. The reference numeral 130 will refer to ball bearings 130t and 130b. While at least three ball bearings 130 are used in an exemplary bearing cartridge 110 for stability, more than three ball bearings 130 can be used in arrangements other than the illustrated example.

Figure 6:
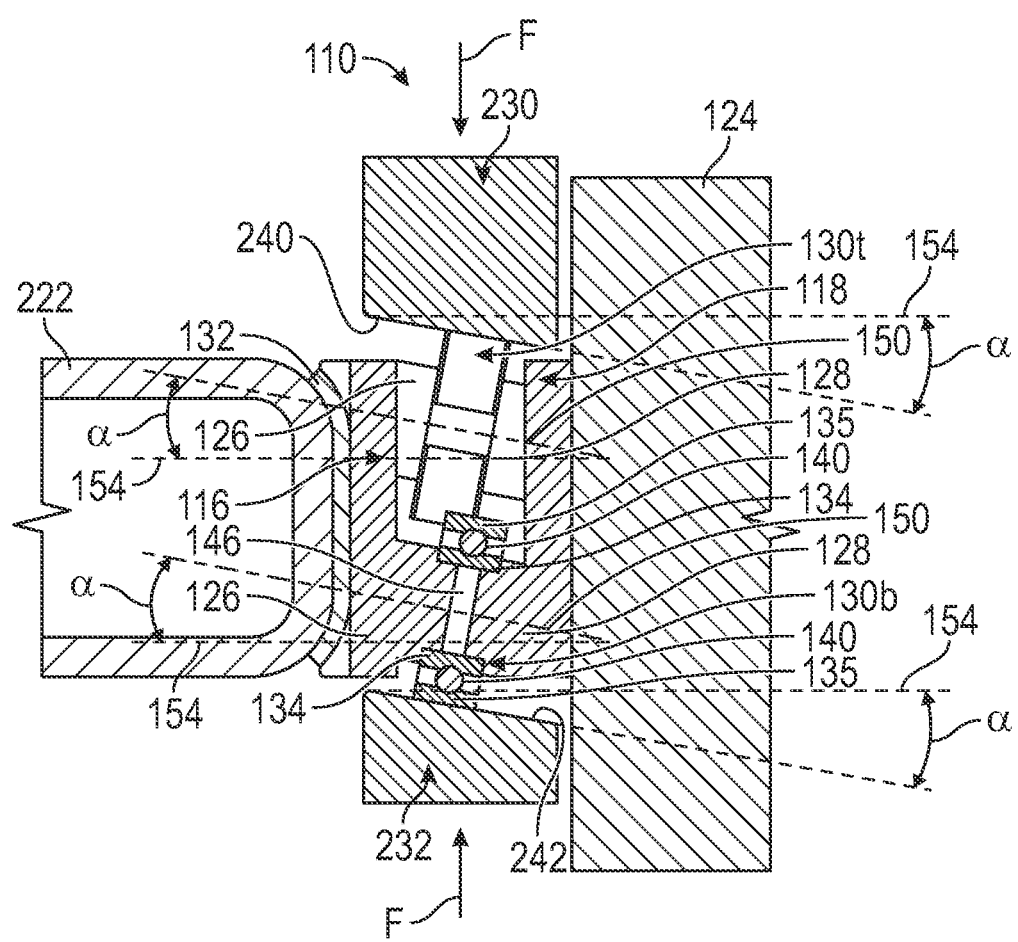
FIG. 6 is an enlarged view of the bearing cartridge portion of FIG. 5.
Figure 8:
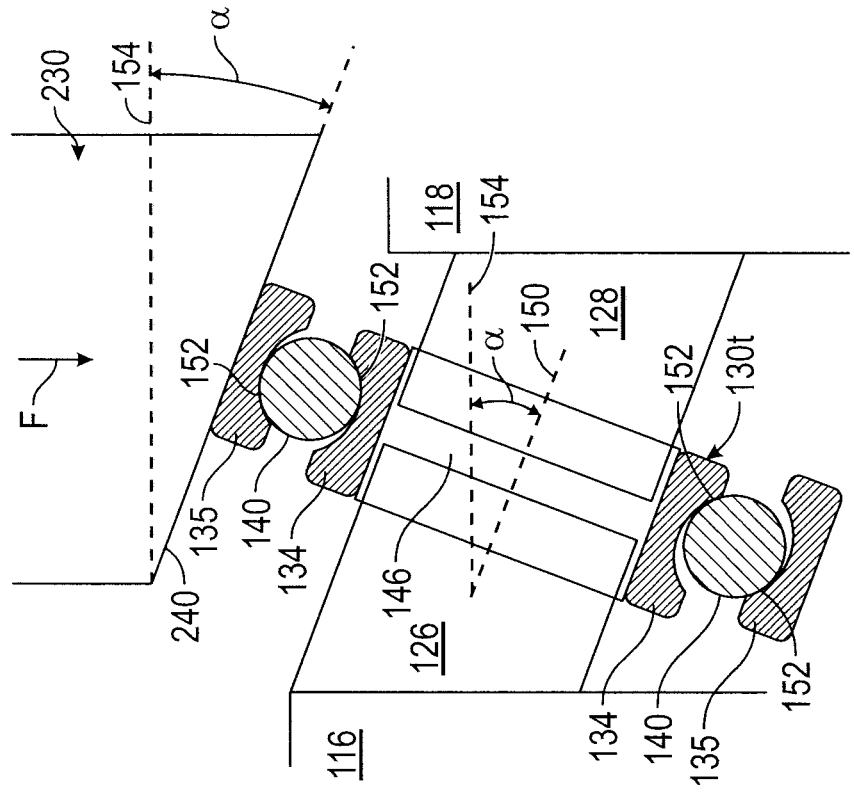
FIG. 8 is a partial cross sectional view, taken along line 8-8 of FIG. 4, of a ball bearing preloaded between an inclined top rail surface and attachment posts.

As shown in the exemplary embodiments of FIGS. 6 and 8, the rolling surfaces 240, 242, respectively of the rails 230, 232 are inclined at a small angle alpha α from the horizontal plane 154 to generate a pre-load for the ball bearings 130 in both the z-axis and the y-axis (along an actuator arm). Additionally, the pivot axis 150 of each set of cooperating posts 126, 128 and thereby of the ball bearing 130 disposed thereon, is inclined at the acute angle alpha α from the horizontal 154. In an exemplary embodiment, the horizontal plane 154 is defined as any plane parallel to a read/write surface of a data storage disk 104. In an exemplary embodiment, angle alpha (α) is between about 5 degrees and about 25 degrees; in some cases, angle alpha (α) is between about 10 degrees and about 15 degrees. If the angle alpha (α) is smaller than about 5 degrees, the inclination is too small to generate an outer race offsetting effect; if the angle alpha (α) is larger than about 25 degrees, the ball bearing cartridge occupies more space along the length of the linear actuator 220 (the length considered to be along the actuator arm assembly 222, perpendicular to the rail axes 234, 236), thereby leaving less space for the linear motor 222. In an exemplary embodiment, the right casing 118 is integral with or attached to E-block 124.

FIG. 6 is an enlarged view of a portion of FIG. 5, showing the components of an exemplary bearing cartridge 110. FIG. 8 is a partial cross sectional view taken along line 8-8 of FIG. 4, showing a ball bearing 130t pre-loaded between an inclined top rail surface 240 and a post attachment 126, 128. In an exemplary embodiment, each bearing 130 includes an inner race 134, an outer race 135 and a plurality of balls 140 rolling in a channel between the two races 134, 135. In an exemplary embodiment, the inner race 134 is held stationary by adhesive attachment to the respective left and right posts 126, 128. Suitable adhesives include those used for pivot cartridges in rotary actuators, such as described in the commonly owned U.S. Pat. No. 10,192,575 for a "Split actuator with multiple head stack assemblies bonded to bearing sleeves," which is incorporated herein by reference. In the illustrated embodiment, the posts 126, 128 do not contact each other; rather, a gap 146 is maintained between ends of the left and right posts 126, 128. Because the inner race 134 is adhesively fixed to the posts 126, 128, the inner race 134 remains fixed with respect to the bearing cartridge 110. In contrast, the balls 140 and the outer race 135 are configured to roll and rotate about the inner race 134. While the illustrated embodiments show two parts 126, 128 that in combination serve as a shaft for the pivoting support of a ball bearing 130, it is contemplated that in some cases, a single shaft element can extend between the actuator arm assembly 122 and linear motor 222.

Referring to FIG. 3, in an exemplary embodiment, the posts 126, 128 are positioned so that the plurality of ball bearings 130 do not contact each other. Rather, the points of contact of each ball bearing 130 in the bearing cartridge 110 are 1) attachment points of inner race 134 on posts 126, 128 and 2) contact with the rolling surface 240 of top rail 230 or the rolling surface 242 of bottom rail 232. In an exemplary embodiment of the bearing cartridge 110, the rolling surfaces 240, 242 of the top and bottom rails 230, 232, respectively, are inclined or tilted at angle alpha (α) with respect to a horizontal x-y direction defined by base deck 144.

Figure 7:
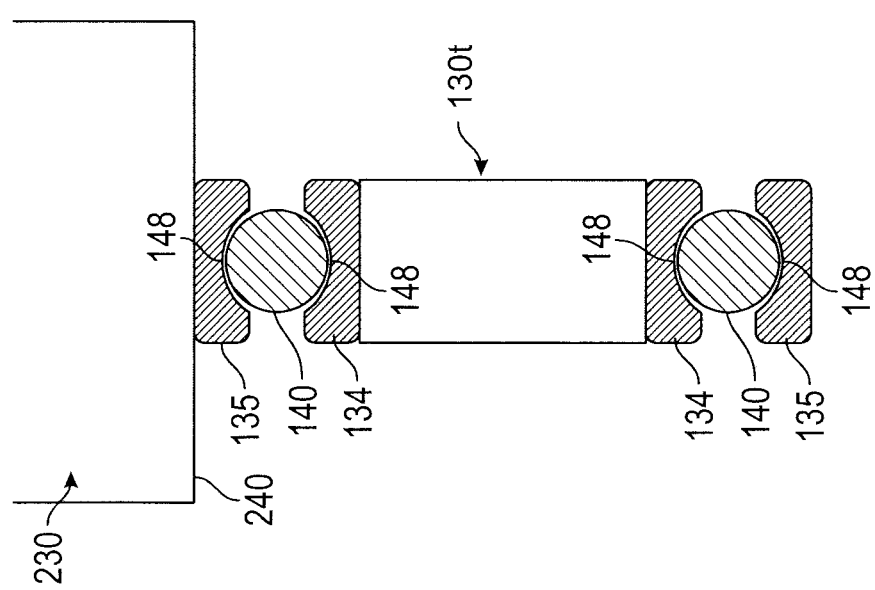
FIG. 7 is a cross sectional view of a ball bearing with no preload.

FIGS. 7 and 8 provide an illustration of the effect of such inclination. FIGS. 7 and 8, for the sake of simplicity, illustrate a single ball bearing 130t that contacts rolling surface 240 of top rail 230. However, these teachings also apply to ball bearings 130b, each of which contacts the rolling surface 242 of bottom rail 232. As shown in FIG. 7, in a case where the outer race 135 rolls against a horizontal surface 240 of top rail 230, gaps 148 exist between each ball 140 and channel surfaces of the inner and outer races 134, 135. These clearance gaps 148 provide for lower friction in the ball bearing 130t. However, the clearance gaps 148 can also lead to lags in rolling performance due to jostling of the balls 140 in the channel between inner race 134 and outer race 135. The clearance gaps 148 may not be even and may be more pronounced in one area of the channel than another area due to gravitational forces, which depend on the ball bearing orientation.

In contrast, with the inclined rolling surface configurations of FIGS. 5, 6 and 8, the assembly of a ball bearing cartridge 110 between top rail 230 and bottom rail 232 with parallel inclined rolling surfaces 240 and 242 leads to a pre-loading of the ball bearings 130t, 130b. Such a pre-loaded ball bearing 130 has an outer race 135 that is offset from the inner race 134 in a direction along pivot axis 150. This offset between the inner and outer races 134, 135 closes gaps in the channel in which balls 140 roll, resulting in close contact points 152. In the assembly of the ball bearing cartridge 110, forces F are introduced as the top rail 230 and bottom rail 232 are pressed together with a ball bearing cartridge 110 therebetween during assembly of the linear actuator assembly 220. These pre-load forces on the ball bearing 130 cause displacement of the outer race 135 relative to the inner race 134. This pre-load reduces the clearance gaps around the balls 140, instead resulting in contact points 152, thereby leading to a smooth rolling and stable structure. As shown in FIG. 8, the force F is provided by pressing the rolling surface 240 on the outer race 135 of a bearing 130t, which is held in a fixed vertical position by the attachment of inner race 134 to posts 126, 128. Referring to FIGS. 6 and 8, each of the aligned sets of posts 126, 128 includes a bearing pivot axis 150 that is parallel to each of the rolling surfaces 240, 242.

While the illustrated embodiments show a particular inclination of the rolling surfaces 240, 242 and bearing pivot axis 150, it is to be understood that an opposite inclination would also be suitable. For example, while the illustrations show a downward inclination to the right of the drawings, a downward inclination toward a left side of the drawings would also work. In the illustrated embodiment, one ball bearing 130t travels along the rolling surface 240 of top rail 230, and two ball bearings 130b roll along the rolling surface 242 of bottom rail 232. This generates a stable structure, in which the two bottom ball bearings 130b prevent tilting of the E-block 124 in the travel direction along the rails 230, 232. However, it is contemplated that these teachings can be used in a bearing cartridge 110 having different numbers and arrangements of ball bearings 130.

Figure 9:
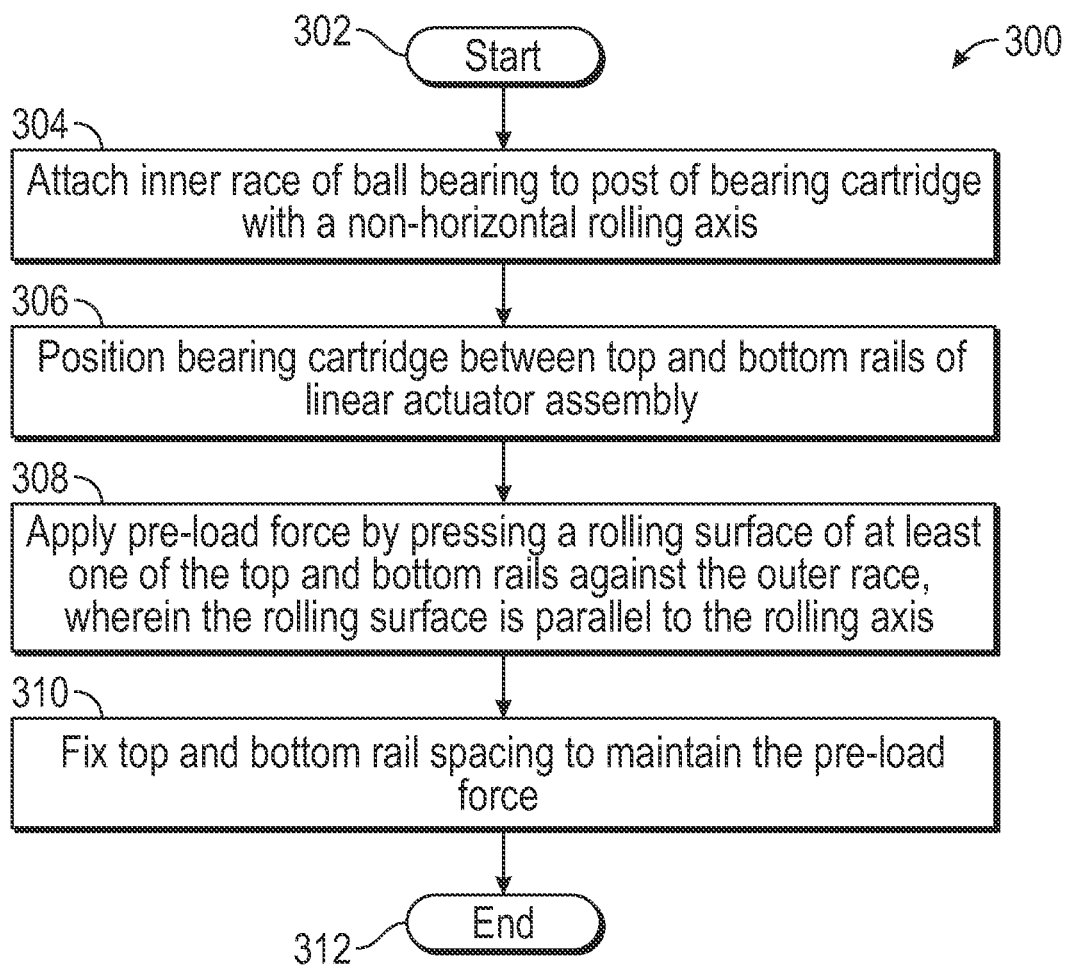
FIG. 9 is a flow chart showing an exemplary method for assembling an exemplary ball bearing cartridge for a linear actuator assembly.

FIG. 9 is a flow chart showing an exemplary method for assembling an exemplary ball bearing cartridge 110 for a linear actuator assembly 220. In an exemplary embodiment, method 300 starts at 302 and progresses to 304, wherein a user attaches an inner race 134 of a ball bearing 130 to a post 126, 128 of a bearing cartridge 110. This attachment orients the bearing pivot axis 150 to a non-horizontal position, such as one that can be accomplished with attachment of the ball bearing 130 to posts 126, 128 having a non-horizontal coincident axis 150. At 306, a user positions the bearing cartridge 110 between top rail 230 and bottom rail 232 of a linear actuator assembly 220. At 308, the user applies a pre-load force F by pressing a rolling surface 240, 242 of at least one of the top and bottom rails 230, 232 against the outer race 135 of the bearing 130. The relevant rolling surface 240, 242 is parallel to the non-horizontal rolling axis 150. At 310, the user fixes a spacing between the top rail 230 and the bottom rail 232 to maintain the applied pre-load force F. Once the linear actuator assembly 220 is assembled, the method ends at 312.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent and patent application documents mentioned in the description are incorporated by reference.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
an actuator arm assembly comprising a first post defining a pivot axis that is inclined between about 5 degrees and about 25 degrees from a horizontal plane defined by a data storage disk surface;
a top guide rail comprising a first rolling surface that is parallel to the pivot axis;
a bottom guide rail spaced from the top guide rail and comprising a second rolling surface that is parallel to the first rolling surface; and
a first ball bearing comprising a first inner race and a first outer race, the first inner race surrounding the first post, and the first outer race in contact with the first rolling surface or the second rolling surface.

2. The device of claim 1 wherein the first outer race is offset from the first inner race along the pivot axis.

3. The device of claim 1 comprising a linear motor assembly comprising a second post, and wherein the first inner race surrounds the second post.

4. The device of claim 3 comprising a gap between the first and second posts.

5. The device of claim 3 wherein the first inner race is fixed to the first and second posts.

6. The device of claim 3 comprising:
a third post of the actuator arm assembly;
a fourth post of the linear motor assembly; and
a second ball bearing comprising a second inner race and a second outer race, the second inner race surrounding the third and fourth posts, and the second outer race in contact with the other of the first rolling surface or the second rolling surface.

7. The device of claim 6 wherein the first and second outer races do not contact each other.

8. The device of claim 1 wherein the first ball bearing does not contact the other of the first rolling surface or the second rolling surface.

9. A data storage device comprising:
an actuator arm assembly comprising one or more actuator arms, a block and a first post, the block having a first side coupled to the one or more actuator arms and a second side coupled to the first post, the first side being opposite to the second side;
a top guide rail comprising a first rolling surface;
a bottom guide rail spaced from the top guide rail and comprising a second rolling surface that is parallel to the first rolling surface; and
a ball bearing comprising an inner race and an outer race, wherein the ball bearing is configured to:
roll with the outer race:
in contact with the first rolling surface or the second rolling surface; and not in contact with the other of the first rolling surface or the second rolling surface; and rotate with the inner race surrounding the first post.

10. The device of claim 9 wherein the first post defines a pivot axis of the ball bearing, and wherein the pivot axis is parallel to each of the first and second rolling surfaces.

11. The device of claim 10 wherein the data storage device comprises a data storage disk surface defining a horizontal plane, and wherein the pivot axis is inclined between about 5 degrees and about 25 degrees from the horizontal plane.

12. The device of claim 10 wherein the outer race is offset from the inner race along the pivot axis.

13. The device of claim 9 wherein the inner race is fixed to the first post.

14. The device of claim 9 comprising a linear motor assembly comprising a second post, wherein the ball bearing is configured to rotate with the inner race surrounding the second post.

15. A method of assembling a data storage device comprising:
- attaching a first ball bearing to a first post configured to extend between an actuator arm assembly and a linear motor assembly, wherein the first ball bearing comprises a first inner race, a first outer race, and a first pivot axis, and wherein the first post is part of a bearing cartridge;
- positioning the bearing cartridge between a top guide rail and a bottom guide rail, at least one of the top or bottom guide rails having a rolling surface inclined between about 5 degrees and about 25 degrees from a horizontal axis;
- pressing the top guide rail and the bottom guide rail toward each other to obtain an offset of the first outer race relative to the first inner race along the pivot axis; and
- securing a spacing between the top and bottom guide rails to maintain the offset.

16. The method of claim 15 comprising adhering the bearing cartridge to a linear motor.

17. The method of claim 15 comprising contacting the first outer race with the top guide rail and not with the bottom guide rail.

18. The method of claim 17 comprising:
- attaching a second ball bearing to a second post configured to extend between the actuator arm assembly and the linear motor assembly, wherein the second ball bearing comprises a second inner race and a second outer race, wherein the second post is part of the bearing cartridge; and
- contacting the second outer race with the bottom guide rail and not with the top guide rail.

19. The method of claim 15 comprising contacting the first outer race with the bottom guide rail and not with the top guide rail.

20. The method of claim 15 wherein attaching the first ball bearing to the first post comprises adhering the first inner race to the first post.

* * * * *